A. L. MOORE.
ROTARY STUMP EXTRACTOR AND LIFT.
APPLICATION FILED MAY 28, 1913.
1,114,505.
Patented Oct. 20, 1914.
2 SHEETS—SHEET 1.
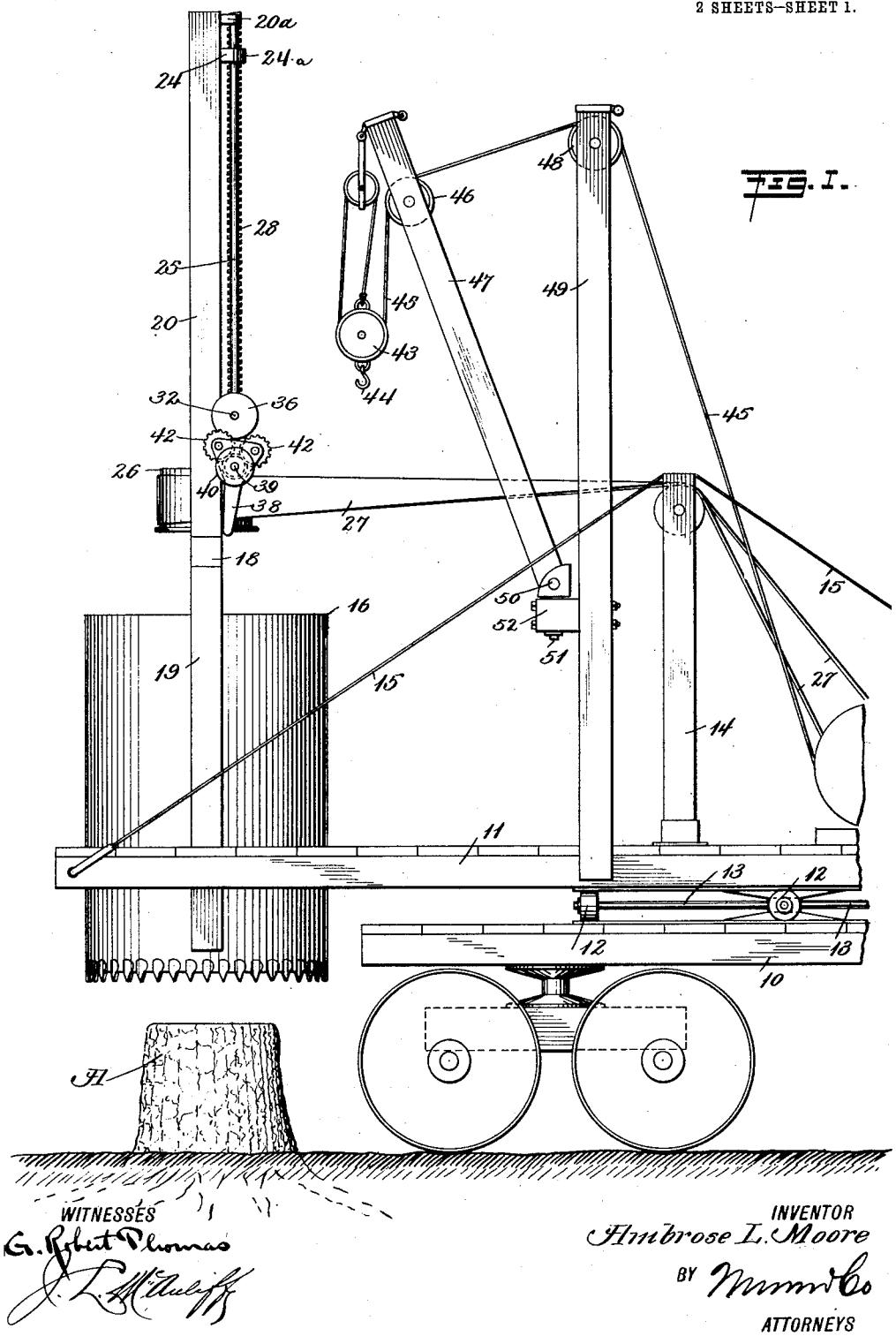
FIG. I.
WITNESSES
G. Robert Thomas
J. L. Ratcliff
INVENTOR
Ambrose L. Moore
BY Munn & Co
ATTORNEYS A. L. MOORE.
ROTARY STUMP EXTRACTOR AND LIFT.
APPLICATION FILED MAY 28, 1913.
1,114,505.
Patented Oct. 20, 1914.
2 SHEETS—SHEET 2.
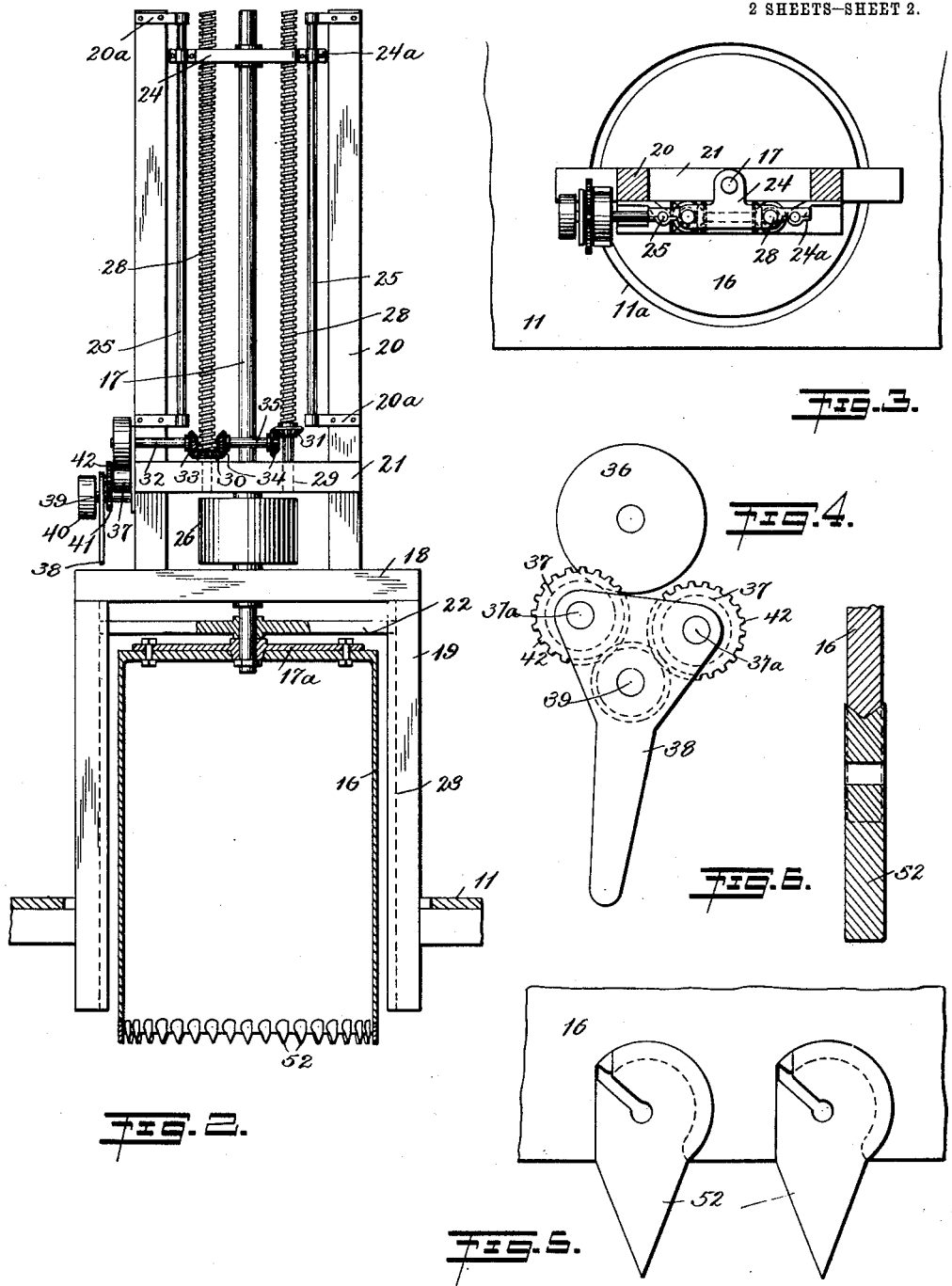
INVENTOR
Ambrose L. Moore

UNITED STATES PATENT OFFICE.

AMBROSE LARKIN MOORE, OF NEW ORLEANS, LOUISIANA.

ROTARY STUMP EXTRACTOR AND LIFT.

1,114,505. Specification of Letters Patent. Patented Oct. 20, 1914.

Application filed May 28, 1913. Serial No. 770,355.

*To all whom it may concern:*

Be it known that I, AMBROSE L. MOORE, a citizen of the United States, and a resident of New Orleans, in the parish of Orleans and State of Louisiana, have invented a new and Improved Rotary Stump Extractor and Lift, of which the following is a full, clear, and exact description.

An object of my invention is to provide a new and improved machine whereby to sever the roots of a stump, and extract the stump in a manner to produce a minimum disturbance of the ground, so that the ground is left substantially intact for cultivation.

The invention consists in novel features whereby a cutter-head will sever the roots of the stump and the stump then be extracted by means of a lift.

In carrying out my invention use is made of a hollow cylindrical cutter head adapted to be lowered into position to encircle the stump, and rotated to sever the roots, provision being made for feeding the cutter head downwardly as the cutting of the roots proceeds, and for raising the cutter head when the severing of the roots has been completed.

In connection with the cutter head, a lift is provided, preferably in the form of a boom carrying a block and fall. The boom, a mast carrying the same, and the cutter head and its appurtenances, are mounted on a platform arranged to turn on a turn-table of a truck, the arrangement being such that after the operation and raising of the cutter head, the platform may be turned to carry the cutter head to one side, and the boom be then manipulated to engage the hook of the fall block with the usual chains secured to the stump.

The distinguishing features of my invention, and the important structural elements characterizing the practical embodiment which is illustrated as one example, will be more particularly explained in the specific description following.

Reference is to be had to the accompanying drawings forming a part of this specification, in which similar characters of reference indicate corresponding parts in all the views.

Figure 1 is a partial side elevation illustrating a machine embodying my invention; Fig. 2 is a detail transverse sectional elevation of the cutter-head and its appurtenances; Fig. 3 is a plan view of the parts shown in Fig. 2; Fig. 4 is a side elevation of the means for feeding and raising the cutter-head and for driving the shaft thereof; Fig. 5 is a fragmentary detail view on an enlarged scale, of a portion of the cutter-head showing inserted teeth; and Fig. 6 is a vertical section through the parts shown in Fig. 5.

In constructing a machine in accordance with the illustrated example, a suitable wheeled truck 10 is provided, which mounts a platform 11 adapted to be revolved on a turn-table including wheels 12 on radial shafts 13. The platform at the sides may be trussed by providing struts 14 and truss wires or rods 15.

For cutting the roots of a stump such as indicated at A, preparatory to extracting and lifting the stump, a cutter-head 16 is mounted on a shaft 17, being secured by a flange 17ª or equivalent means. The shaft has a suitable bearing in a cross bar 18 of uprights 19 supported on the platform 11 at one side, said cutter-head being desirably in the form of a hollow cylinder, and movable vertically in an opening 11ª in said platform. The shaft 17 has guided movement also in a second cross bar 21 extending between uprights 20 that rise from the cross bar 18. There is provided on the lower end of the shaft 17 a cross-head 22, the ends of which have guided movement in vertical grooves 23 in the standards 19. At the upper end of the shaft a second cross-head 24 is provided, the ends of which have guided movement on guide rods 25 suitably supported on the standards 20 as by brackets 20ª. The shaft 17 is adapted to turn relatively to the cross-heads 22, 24, but I provide means for raising and lowering the upper cross-head 24 and with it the shaft 17 and the lower cross-head 22, and the cutter-head, as hereinafter explained.

The cross-head 24 is clamped to the rods 25 by means of clamp plates 24ª. Any improved means may be provided for turning the shaft 17, for giving a rotary movement to the cutter-head 16; for the purpose I have shown a belt pulley 26, from which a belt 27 runs to any suitable power (not shown) on the platform 11. The shaft 17 turns with pulley 26, but may slide therethrough.

To feed the cutter-head 16 downwardly for severing the roots, and for raising the same after performing the cutting operation, a suitable feed is provided; for the purpose in the present case I make use of feed screws 28 stepped as at 29 in the cross bar 21, and having threaded engagement with the cross-head 24. On the feed screws 28, which are parallel, beveled pinions 30, 31 are secured, and a transverse shaft 32 has a beveled pinion 33 meshing with the pinion 30, while pinions 34 on a shaft 35 mesh with the respective pinions 30, 31.

The shaft 32 may be driven in any suitable manner as by a friction wheel 36 thereon, which is adapted to be driven by either of two friction pulleys 37 on a rocking lever 38, said lever being mounted on a stud shaft 39 having a belt pulley 40 adapted to be driven in practice by a belt (not shown) from the power provided on the platform 11. On the shafts 37ª of the friction wheels 37 are secured the pinions 42, both of which are in mesh with a toothed pinion 41 on the driven shaft 39. It will be obvious that the friction wheels 37 will be driven in opposite directions, and by throwing the lever 38 either friction wheel may be thrown into engagement with the friction wheel 36 on the driven shaft 32, whereby through the described pinions the feed screws 28 may be turned to either lower the shaft 17 for feeding the cutter-head 16 downwardly, or to raise said shaft, and with it, the cutter-head.

The lift for extracting and lifting the stump A, comprises a fall block 43, having a hook 44 to engage the chain (not shown) usually secured to a stump when extracting the same, said fall block being raised or lowered by a fall rope 45 which runs over a pulley 46 on a boom 47, and over a pulley 48 on a mast frame 49. The boom is arranged to have the downward movements to locate the fall block over the stump and to give the necessary lifting action for extracting the stump. Thus the boom may be pivoted at its foot, as at 50, for vertical movement, and be provided with a swivel 51 extending through a cross bar 52 on the mast frame 49. It is to be understood that any equivalent means may be provided for permitting the desired movements of the boom.

In operation, the platform 11 is turned on the truck 10 to bring the cylindrical cutter-head 16 over the stump, and then, through the described feed and drive, the cutter-head is gradually lowered and given a rotary movement on its axis to sever the roots of the stump. The feed is then reversed to raise the cutter-head, after which the platform is turned and the boom lowered to properly position the fall block 43 relatively to the stump, and after connection has been made with the usual chain around the stump, the raising of the boom will serve to lift and extract the stump, leaving the roots in the ground. The ground will thus not be materially disturbed, but will be left in condition for cultivation.

Desirably the cutter-head 16 is provided at its lower edge with an annular series of insertible teeth 52, of any approved form, as illustrated in Figs. 5 and 6.

The described construction affords a practical means for carrying my invention into effect, and I would state in conclusion that I do not limit myself strictly to the mechanical details herein illustrated, since manifestly the same can be considerably varied without departing from the spirit of the invention defined in the following claim.

Having thus described my invention, I claim as new, and desire to secure by Letters Patent:

In a machine of the kind described, a vertically disposed cutter-head, a vertical shaft carrying said cutter-head and mounted for vertical movement, means for turning said shaft, parallel feed screws at opposite sides of the shaft, means for guiding the lower end of the shaft, a cross-head secured near the upper end of the shaft and having threaded engagement with the feed screws, guiding means for the last mentioned cross-head, beveled pinions on the feed screws, an intermediate shaft having beveled pinions in mesh with the pinions on the feed shaft, a second shaft having a pinion in mesh with one of the pinions of the feed screws, and means for giving a reverse movement to said last mentioned shaft.

In testimony whereof I have signed my name to this specification in the presence of two subscribing witnesses.

AMBROSE LARKIN MOORE.

Witnesses:
HENRY J. GOSSIE,
HARRY B. CAPLAN.